US012002975B2

(12) United States Patent
Andrews et al.

(10) Patent No.: US 12,002,975 B2
(45) Date of Patent: *Jun. 4, 2024

(54) STRUCTURAL BATTERY MODULE AND BATTERY PACK (71) Applicant: Caterpillar Inc., Peoria, IL (US)

(72) Inventors: David M. Andrews, Stamford (GB); Brian R. Bell, West Lafayette, IN (US); Adam R. Rosenberger, Washington, IL (US); David S. Moore, Oundle (GB)

(73) Assignee: Caterpillar Inc., Peoria, IL (US)

(*) Notice: Subject to any disclaimer, the term of this patent is extended or adjusted under 35 U.S.C. 154(b) by 203 days.

This patent is subject to a terminal disclaimer.

(21) Appl. No.: 17/108,490

(22) Filed: Dec. 1, 2020

(65) Prior Publication Data
US 2022/0173367 A1    Jun. 2, 2022

(51) Int. Cl.
*H01M 50/502* (2021.01)
*H01M 50/15* (2021.01)
(Continued)

(52) U.S. Cl.
CPC .......... *H01M 50/20* (2021.01); *H01M 50/15* (2021.01); *H01M 50/166* (2021.01);
(Continued)

(58) Field of Classification Search
CPC .......... H01M 50/20–211; H01M 50/218–251; H01M 50/258–264; H01M 50/284; H01M 50/10–298; H01M 50/50–598
See application file for complete search history.

(56) References Cited

U.S. PATENT DOCUMENTS 5,140,744 A * 8/1992 Miller .................. H01M 50/20
429/96
6,326,103 B1 * 12/2001 Ido ..................... H01M 10/617
429/99
(Continued)

FOREIGN PATENT DOCUMENTS

CN    105720220 A    6/2016
CN    105742535 B    7/2018
(Continued)

OTHER PUBLICATIONS

Written Opinion and International Search Report for Int'l. Patent Appln. No. PCT/US2021/059603, dated Feb. 22, 2022 (13 pgs).
(Continued)

*Primary Examiner* — Jonathan Crepeau
*Assistant Examiner* — Jacob Buchanan
(74) *Attorney, Agent, or Firm* — Bookoff McAndrews PLLC (57) ABSTRACT

A battery module for construction of a battery pack includes a battery sealed in a rectangular housing with front and rear open ends closed by front and rear plates, respectively. The rear plate includes a plurality of rear plate bores in axial alignment with a plurality of housing bores proximal the rear open end of the housing. The front plate includes a plurality of front plate bores in axial alignment with a plurality of housing bores proximal the front open end of the housing. The front plate additionally includes positive and negative terminals electrically connected to the battery.

20 Claims, 7 Drawing Sheets

(51) Int. Cl.
  *H01M 50/166* (2021.01)
  *H01M 50/20* (2021.01)
  *H01M 50/209* (2021.01)
  *H01M 50/258* (2021.01)
  *H01M 50/262* (2021.01)

(52) U.S. Cl.
  CPC ....... *H01M 50/209* (2021.01); *H01M 50/258* (2021.01); *H01M 50/262* (2021.01); *H01M 50/502* (2021.01)

(56) References Cited

U.S. PATENT DOCUMENTS

| | | | | |
|---|---|---|---|---|
| 6,406,812 | B1* | 6/2002 | Dreulle | H01M 50/209 |
| | | | | 429/96 |
| 6,482,541 | B1* | 11/2002 | Bator, Jr. | H01M 50/20 |
| | | | | 429/96 |
| 7,955,729 | B2 | 6/2011 | Onuki | H01M 50/271 |
| | | | | 429/153 |
| 9,024,572 | B2 | 5/2015 | Nishihara et al. | |
| 9,172,254 | B2 | 10/2015 | Ganor | |
| 9,196,891 | B2 | 11/2015 | Tsuchiya et al. | |
| 10,629,860 | B2 | 4/2020 | Schröder et al. | |
| 2002/0179552 | A1* | 12/2002 | Marraffa | H01M 50/204 |
| | | | | 211/186 |
| 2011/0104552 | A1* | 5/2011 | Kim | H01M 50/209 |
| | | | | 429/151 |
| 2012/0115011 | A1* | 5/2012 | Kim | H01M 10/613 |
| | | | | 429/156 |
| 2013/0252071 | A1* | 9/2013 | Teramoto | H01M 10/02 |
| | | | | 429/211 |
| 2013/0288094 | A1* | 10/2013 | Noh | H01M 10/0413 |
| | | | | 429/99 |
| 2016/0164053 | A1 | 6/2016 | Lee et al. | |
| 2019/0259993 | A1* | 8/2019 | Olofsson | H01M 50/20 |
| 2021/0091438 | A1* | 3/2021 | Backhaus | H01M 50/24 |

FOREIGN PATENT DOCUMENTS

| | | | | |
|---|---|---|---|---|
| CN | 110010807 A | 7/2019 | | |
| EP | 2343752 A2 * | 7/2011 | ......... | H01M 10/425 |
| EP | 2343752 A2 | 7/2011 | | |
| WO | WO-2019141524 A1 * | 7/2019 | ......... | B66F 9/07531 |

OTHER PUBLICATIONS

300mpg.org, "Tap, Stack, and Rack: LEAF Vectrix Batteries," webpage downloaded from the Internet at https://300mpg.org/2015/04/17/tap-stack-and-rack-leaf-vectrix-batteries/ on Oct. 21, 2020, 12 pp. (Apr. 17, 2015).

East Penn Mfg. Co., Inc, "DEKA Unigy II," product brochure downloaded from the Internet at https://www.solarelectricsupply.com/media/custom/upload/Deka-Unigy-II-Spacesaver-Brochure.pdf on Oct. 21, 2020, 4pp. (Mar. 2011).

East Penn Mfg. Co., Inc, "DEKA Solar Photovoltaic Batteries: Unigy II Modules," product brochure downloaded from the Internet at https://www.solarelectricsupply.com/media/custom/upload/Unigy-II_Solar-Battery-Models.pdf on Oct. 21, 2020, 2 pp. (Oct. 2011).

GNP Industrial Power, "Photovoltaic & Alternative Energy," product brochure, 12 pp. (Jul. 2008).

Off Grid Solar, "How to Build a Lithium-Ion Battery System for less than $400 per kWh," webpage downloaded from the Internet at https://offgridsolarbook.com/blog/2019/5/29/second-life-battery-pack-with-nissan-leaf-modules on Oct. 21, 2020, 7 pp. (May 29, 2019).

Powertec Solutions International, "Li-36 Battery Upgrade: Product Overview," webpage downloaded from the Internet at https://www.powertecsolutions.net/solutions/li-36-battery-upgrade/ on Oct. 21, 2020, 4 pp.

Proterra, "The Proterra Battery Platform," webpage downloaded from the Internet at https://www.proterra.com/proterra-powered/battery-technology/ on Oct. 21, 2020, 12 pp. (2019).

* cited by examiner

STRUCTURAL BATTERY MODULE AND BATTERY PACK

TECHNICAL FIELD

This patent disclosure relates generally to batteries and, more particularly to a structural battery module to enable different battery pack configurations.

BACKGROUND

Current industrial applications require a broad range of battery sizes and performance requirements. For example, battery pack requirements may range from 20 kW to 300 kWh and from 48V to 700V. Maintaining a broad range of battery sizes generally results in increased inventory and tooling costs, as well as increased investment in research and development. Further, diminished capacity or performance characteristics of batteries utilized in a given application may result in increased costs and challenges in the disposal or recycling of such batteries.

In order to meet some of these challenges, manufacturers have developed arrangements where a plurality of battery modules may be assembled into a variety of sizes to meet individual requirements of various applications. For example, Absolyte GP has developed a modular steel tray design wherein a plurality of single cell modules may be transported to a desired location and then assembled with a modular steel tray design and connected to provide required capacity, a modular steel tray being disposed between each row of modules.

SUMMARY

The disclosure describes, in one aspect, a battery module for construction of a battery pack. The battery module includes a battery disposed within a rectangular housing, and front and rear plates. The rectangular housing includes a top face, a bottom face, a first side face extending between the top face and the bottom face, a second side face extending between the top face and the bottom face, a front open end and a rear open end. The housing also includes a plurality of housing bores extending substantially perpendicularly through the top face, the bottom face, the first side face and the second side face proximal to the front open end, and a plurality of housing bores extending substantially perpendicularly through the top face, the bottom face, the first side face and the second side face proximal to the rear open end. The rear plate closes the rear open end of the housing. The rear plate includes a plurality of rear plate bores in axial alignment with the plurality of housing bores proximal the rear open end of the housing. The front plate closes the front open end of the housing. The front plate includes a plurality of front plate bores in axial alignment with the plurality of housing bores proximal the front open end of the housing. The front plate also includes a positive terminal and a negative terminal electrically connected to the battery. The battery is sealed within the rectangular housing, the rear plate, and the front plate.

The disclosure describes, in another aspect, a battery pack including a plurality of battery modules, and at least two couplers. Each battery module includes a battery disposed within a rectangular housing, and front and rear plates. The rectangular housing includes a top face, a bottom face, a first side face extending between the top face and the bottom face, a second side face extending between the top face and the bottom face, a front open end and a rear open end. The housing also includes a plurality of housing bores extending substantially perpendicularly through the top face, the bottom face, the first side face and the second side face proximal to the front open end, and a plurality of housing bores extending substantially perpendicularly through the top face, the bottom face, the first side face and the second side face proximal to the rear open end. The rear plate closes the rear open end of the housing. The rear plate includes a plurality of rear plate bores in axial alignment with the plurality of housing bores proximal the rear open end of the housing. The front plate closes the front open end of the housing. The front plate includes a plurality of front plate bores in axial alignment with the plurality of housing bores proximal the front open end of the housing. The front plate also includes a positive terminal and a negative terminal electrically connected to the battery. The battery is sealed within the rectangular housing, the rear plate, and the front plate. The at least two couplers secure together at least a first battery module and a second battery module. At least a first of the couplers is disposed through at least one of the plurality of rear plate bores in axial alignment with at least one of the plurality of housing bores proximal the rear open end of the housing. At least a second of the couplers is disposed through at least one of the plurality of front plate bores in axial alignment with at least one of the plurality of housing bores proximal the front open end of the housing.

The disclosure describes, in yet another aspect, method of constructing a battery pack. The method includes providing a plurality of battery modules. Each battery module includes a battery disposed within a rectangular housing, and front and rear plates. The rectangular housing includes a top face, a bottom face, a first side face extending between the top face and the bottom face, a second side face extending between the top face and the bottom face, a front open end and a rear open end. The housing also includes a plurality of housing bores extending substantially perpendicularly through the top face, the bottom face, the first side face and the second side face proximal to the front open end, and a plurality of housing bores extending substantially perpendicularly through the top face, the bottom face, the first side face and the second side face proximal to the rear open end. The rear plate closes the rear open end of the housing. The rear plate includes a plurality of rear plate bores in axial alignment with the plurality of housing bores proximal the rear open end of the housing. The front plate closes the front open end of the housing. The front plate includes a plurality of front plate bores in axial alignment with the plurality of housing bores proximal the front open end of the housing. The front plate also includes a positive terminal and a negative terminal electrically connected to the battery. The battery is sealed within the rectangular housing, the rear plate, and the front plate. The method further includes disposing a rectangular housing of a first battery module of the plurality of battery modules adjacent a rectangular housing of a second battery module of the plurality of battery modules. The method further includes disposing a first coupler through a rear plate bore of the first battery module, a housing bore through the rectangular housing of the first battery module, a housing bore through the rectangular housing of the second battery module, and a rear plate bore of the second battery module to secure the first and second battery module together. The method further includes disposing a second coupler through a front plate bore of the second battery module, a housing bore through the rectangular housing of the second battery module, a housing bore through the rectangular housing of the second battery module, and a front plate bore of the second battery module to secure the second and second battery module together.

DETAILED DESCRIPTION

Figure 1:
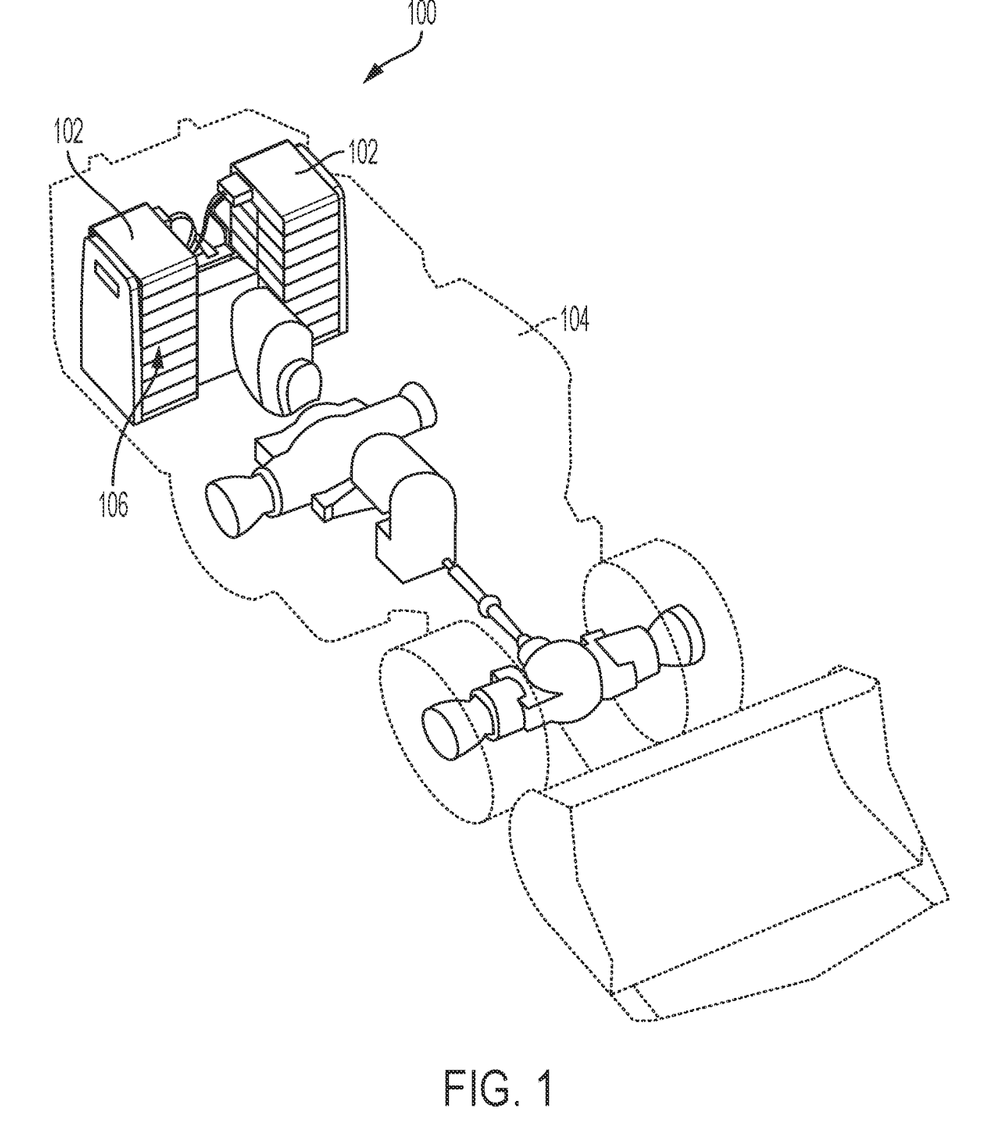
FIG. 1 is an isometric view of an exemplary mobile machine in which a battery system in accordance with teachings of this disclosure may be utilized.

This disclosure relates to a battery system 100 that may be utilized to construct battery packs 102 for use in various applications, such as the machine 104 of FIG. 1. While the arrangement is illustrated in connection with a mobile machine, more particularly, a front end loader, the arrangement disclosed herein has universal applicability in various other types of machines as well. The term "machine" may refer to any machine that performs some type of operation associated with an industry such as mining, construction, farming, transportation, or any other industry known in the art. For example, the machine may be an earth-moving machine, such as a wheel loader, excavator, dump truck, backhoe, motor grader, material handler or the like. Moreover, an implement may be connected to the machine. Such implements may be utilized for a variety of tasks, including, for example, loading, compacting, lifting, brushing, and include, for example, buckets, compactors, forked lifting devices, brushes, grapples, cutters, shears, blades, breakers/hammers, augers, and others.

Figure 5:
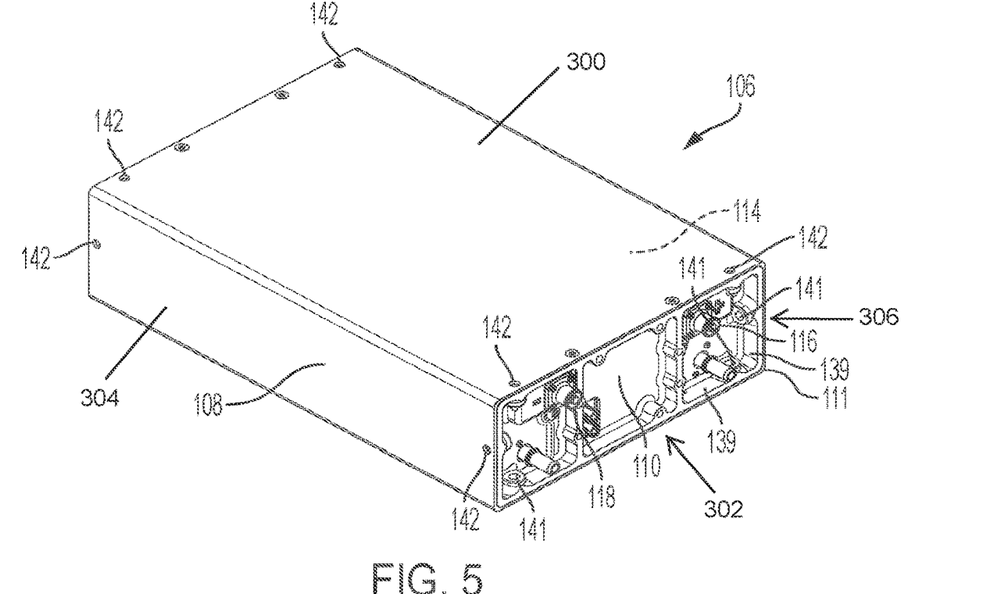
FIG. 5 is an enlarged, front isometric view of a battery module in accordance with teachings of this disclosure.
Figure 6:
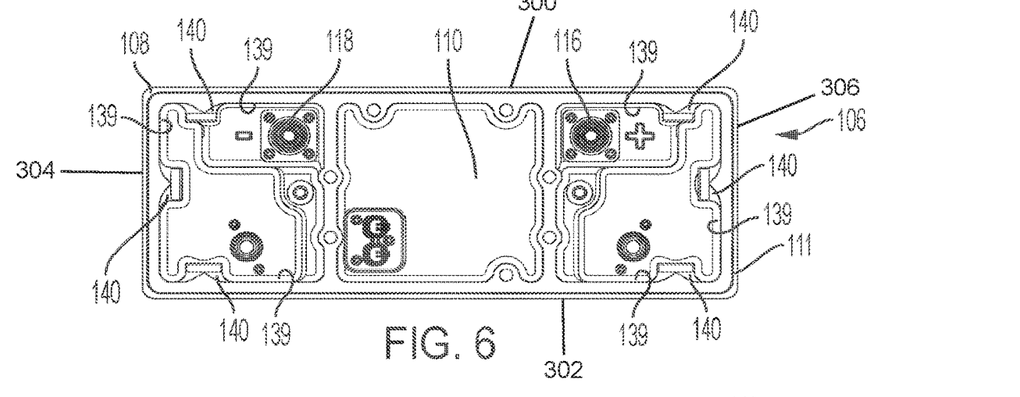
FIG. 6 is a front elevational view of the battery module of FIG. 5.
Figure 7:
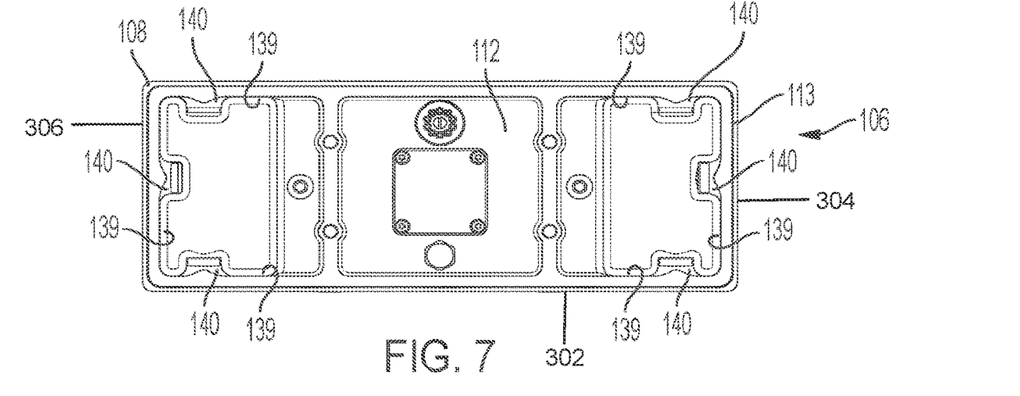
FIG. 7 is a rear elevational view of the battery module of FIG. 5.

The battery system 100 includes a plurality of battery modules 106 that may be coupled in various configurations in order to provide various battery packs 102 of desired power output and voltage output. An exemplary battery module 106 is illustrated in FIGS. 5-7, and includes a rectangular housing 108, a front plate 110, and a rear plate 112. The housing 108 has a channel construction, including a top face 300, a bottom face, 302, and first and second side faces 304, 306 extending between the top and bottom faces 300, 302. The front plate 110 closes the front open end 111 of the housing 108, and the rear plate 112 closes the rear open end 113 of the housing 108 to form a sealed structure.

The housing 108, and front and rear plates 110, 112 may be fabricated by any appropriate method and of any appropriate materials. For example, the housing 108 may be three-D printed, stamped, otherwise formed, molded or extruded of a filled or unfilled polymeric material. Similarly, the front and rear plates 110, 112 may be three-D printed, cast, or otherwise molded from a filled or unfilled polymeric material.

Each battery module 106 houses a battery 114 that may be of any construction, as will be understood by those of skill in the art. Positive and negative terminals 116, 118 may be provided along the front plate 110. Inasmuch as the battery 114 is sealed within the battery module 106, the battery module 106 may be transported and handled for further construction of a desired battery pack 102. Returning to FIGS. 2-4, in order to electrically couple the battery modules 106, any appropriate electrical couplers, such as the plurality of cables 120 may be provided.

In at least one embodiment, the battery pack 102 further includes a base 122 upon which a plurality of battery modules 106 may be supported and coupled together. While the base 122 may not be required in all embodiments, the base 122 may provide added support to the constructed battery pack 102 and may facilitate further handling, particularly in larger battery packs 102. As may be seen in the FIG. 4, in particular, the base 122 may be of a rectangular design, and may include structural elements such as a rectangular frame 124 with cross-supports 126 that may enhance strength and stability, while minimizing weight. The base 122 may further include structure for enhancing attachment a battery module 106. For example, the frame 124 may include a plurality of bosses 128, which may be internally threaded for engagement with respective couplers 130, such as bolts or screws, the significance of which will be discussed below. The illustrated base 122 is sized to support two battery modules 106. It will be appreciated, however, that the battery system 100 may include a plurality of sizes of bases, such as bases sized to support one battery module 106, as well as three, four or more battery modules 106 side by side.

The battery pack 102 may optionally further include a distribution unit 132 if desired. The battery modules 106 may be electrically connected to the distribution unit 132, here, by way of the cables 120. The distribution unit 132 may act as a controller to allow distribution of power to one or more loads of a machine 104. For example, in an electrical machine, power may be provided to a drive system and/or individual components of the machine.

In accordance with an aspect of this disclosure, the battery modules 106 may be secured together to provide a battery pack 102 that is structurally stable without the need for an external frame between stacked battery modules 106. In order to secure the battery modules 106 together, each battery module 106 includes a plurality of coupling arrangement at opposite plates 110, 112 of the battery module 106. More particularly, the front and rear plates 110, 112 include flanged surfaces 139 including a plurality of coupling bosses 140 through which a plurality of plate bores 141 extend, while the housing 108 includes a plurality of housing bores 142 disposed in alignment with the plate bores 141 of the coupling bosses 140. Further, while the front and rear plates 110, 112 have been illustrated with coupling bosses 140, it will be appreciated that the flanged surfaces 139 themselves may include the plate bores 141. A plurality of couplers 130, such as bolts or rivets, are provided for disposition through the coupling bosses 140 to couple the battery modules 106 together.

According to an aspect of this disclosure, the plate bores 141 and housing bores 142 may extend substantially perpendicular to the housing 108. In this way, couplers 130 may readily be assembled through the plate bores 141 and housing bores 142 of adjacently disposed battery modules 106. Those of skill in the art will appreciate that the coupling arrangement may provide enhanced stability to the battery module 106 in that the couplers 130 extend through both plate bores 141 and housing bores 142, further stabilizing the relationship between the front and rear plates 110, 112 and the housing 108.

In assembly, a first battery module 150 may be optionally positioned on a base 122 sized to support a desired number of battery modules 106 in a horizontal configuration. In positioning the first battery module 150, the housing bores through the housing 151 and the aligned plate bores through the coupling bosses 152, 153 at the lower edge 154 of the rear plate 159 of the first battery module 150 are disposed in alignment with the bosses 128 of the base 122. Couplers 130 are then inserted into and secured within the coupling bosses 152, 153 of the rear plate 159 of the first battery module 150 and the bosses 128 of the base 122 to secure the first battery module 150 to the base 122. While this procedure has been explained in detail with regard to a rear plate 159 of the first battery module 150, this same procedure is followed with regard to a front plate 158 of the first battery module 150, inserting couplers 130 into plate bores along the front plate lower edge of the first battery module 150, the housing bores through housing 151, and bosses 128 of the base 122.

A second battery module 160 may be positioned on an upper surface of the first battery module 150; similarly, the housing bores through the housing 161 and the plate bores through coupling bosses 162, 163 along the lower edge 164 of the rear plate 169 of the second battery module 160 are positioned in alignment with the housing bores through the housing 151 and plate bores through the coupling bosses 155, 156 of the rear plate 159 along the upper edge 157 of the first battery module 150. Couplers 130 are then inserted into the housing bores of the housings 151, 161, and secured within the plate bores through the coupling bosses 162, 163 of the second battery module 160 and the plate bores through the coupling bosses 155, 156 of the first battery module 150 to secure the second battery module 160 to the first battery module 150. As with the securing of the first battery module 150 to the base 122, this same procedure is performed with regard to the front plates 158, 168 of the first and second battery modules 150, 160.

This process may be continued, securing a third battery module 170 at plate bores through coupling bosses 172, 173 to plate bores through coupling bosses 165, 166 along the upper edge 167 of the second battery module 160 at both its front and rear plates 168, 169. The process is further continued until a desired number of battery modules 106 are secured together.

Figure 2:
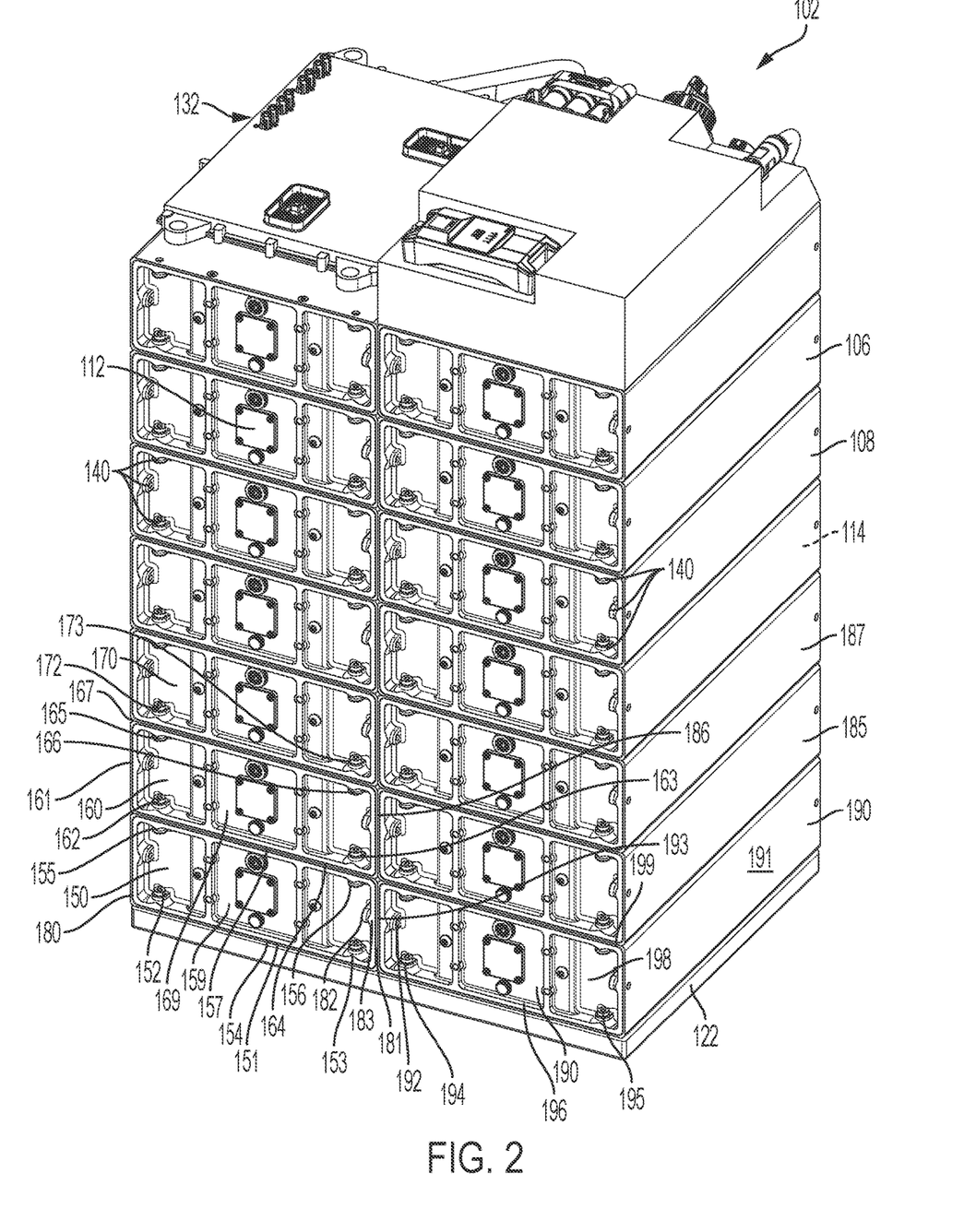
FIG. 2 is a rear isometric view of an exemplary embodiment of a battery pack according to teachings of this disclosure.
Figure 3:
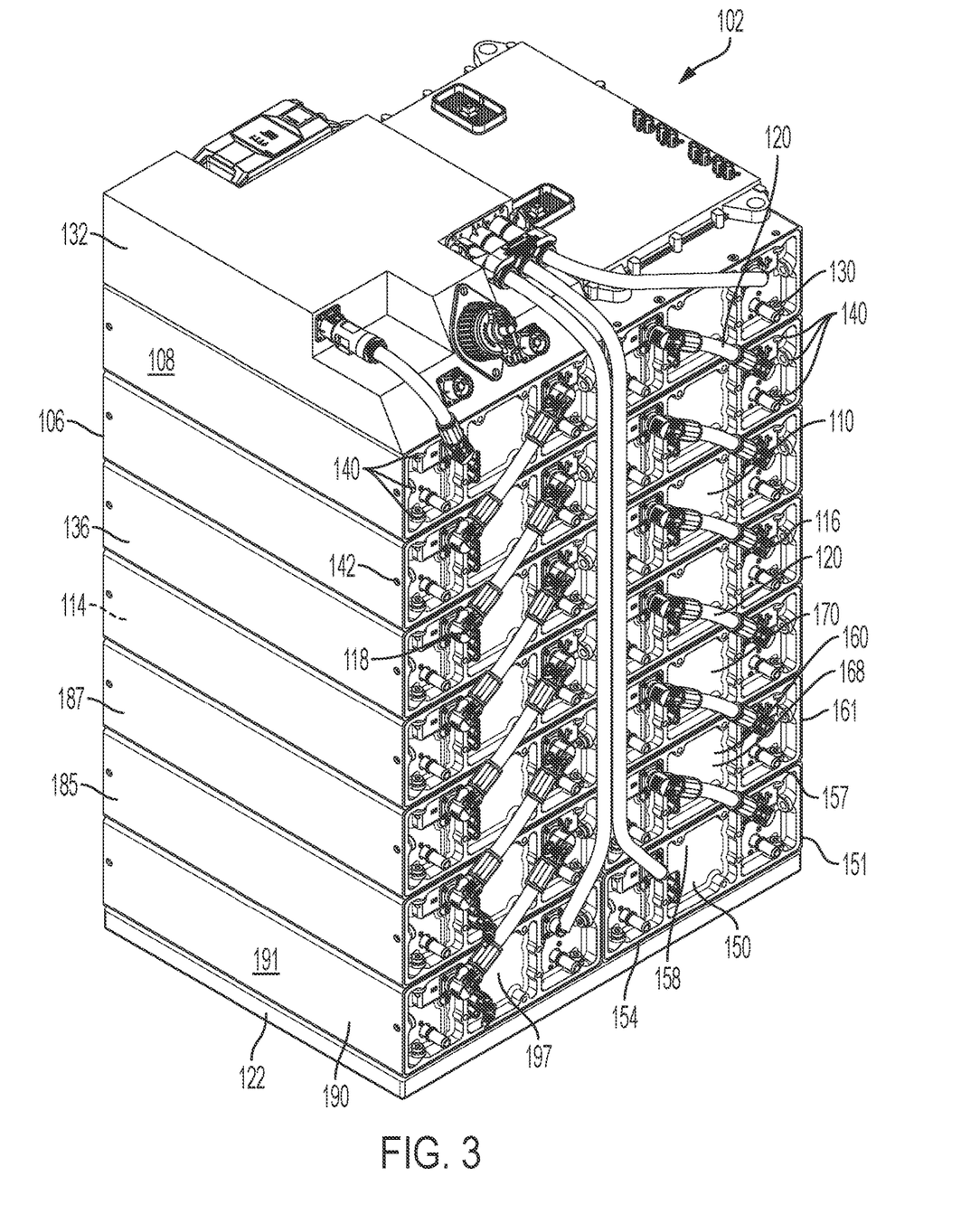
FIG. 3 is a front isometric view of the battery pack of FIG. 2.
Figure 4:
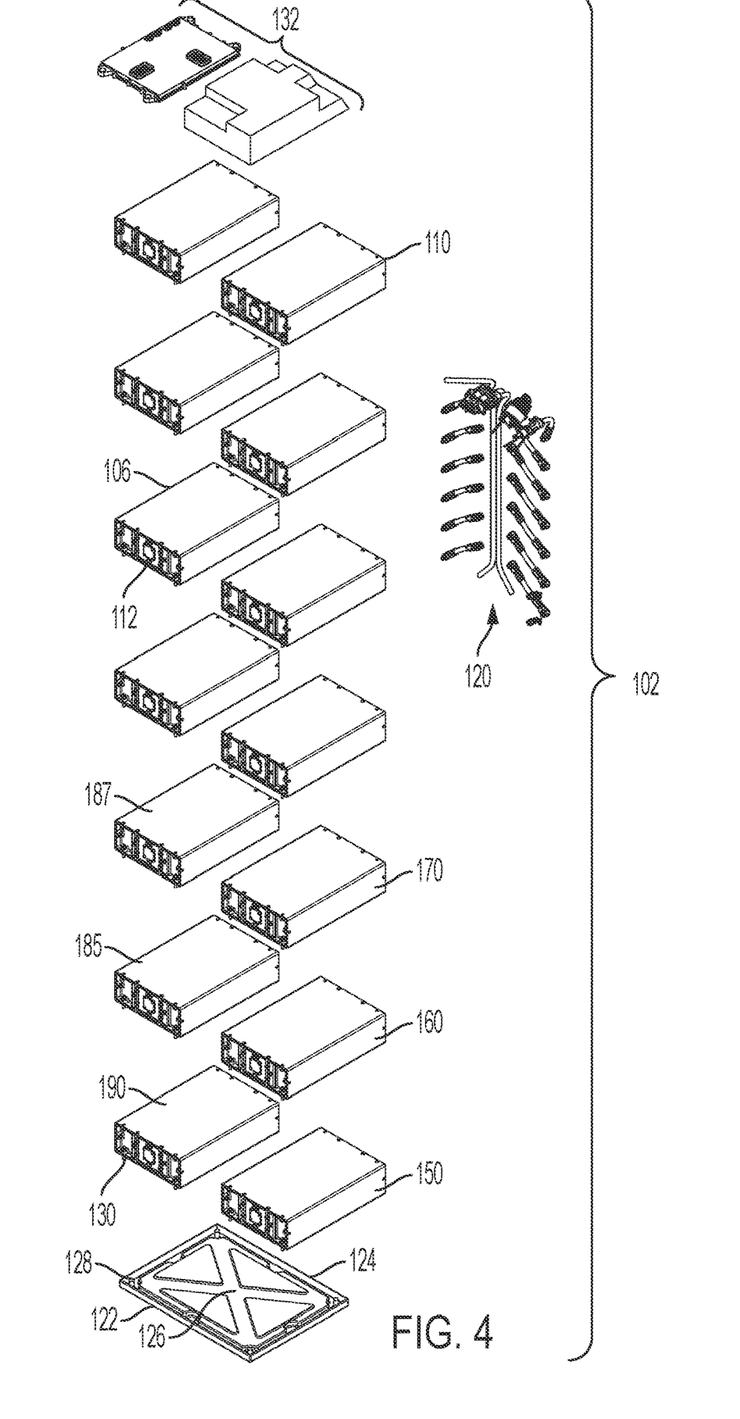
FIG. 4 is an exploded rear isometric view of the battery pack of FIGS. 2 and 3.

According to another aspect of this disclosure, additional battery modules 106 may be coupled at the lateral faces 180, 181 of the first battery module 150, as well as subsequently coupled battery modules 160, 170. In the embodiment of FIGS. 2-4, for example, a fourth battery module 190 is positioned laterally from the first battery module 150. That is, the housing 191 of the fourth battery module 190 is positioned on the base 122 and adjacent the lateral face 181 of the first battery module 150. In positioning the fourth battery module 190, the housing bore through the housing 191 and the plate bore through coupling boss 192 along the lateral edge 193 of the fourth battery module 190 is positioned in axial alignment with the housing bore through housing 151 and the plate bore of the coupling boss 182 along the lateral edge 183 of the first battery module 150, and the plate bores through the housing 191 and the plate bores of coupling bosses 194, 195 along the lower edge 196 of the fourth battery module 190 are positioned in axial alignment with bosses 128 of the base 122. A mating coupler 130 is then engaged within the coupling boss 192 of the fourth battery module 190 and coupling boss 182 of the first battery module 150, and couplers 130 are engaged within coupling bosses 194, 195 of the fourth battery module 190 and bosses 128 of the base 122.

As with the assembly of the first, second, and third battery modules 150, 160, 170, while this procedure has been explained in detail with regard to a rear plate 198 of the fourth battery module 190, this same procedure is followed with regard to a front plate 197 of the fourth battery module 190, inserting couplers 130 into bores of the coupling bosses along the front plate lateral and lower edges of the fourth battery module 190 and the first battery module 150, and bosses 128 of the base 122. Similarly, a fifth battery module 185 may be secured to a lateral face 186 of the second battery module 160 and an upper face 199 of the fourth battery module 190. Again, this process may continue, adding a sixth battery module 187 and any additional battery modules 106 until a desired battery pack 102 is constructed.

If utilized, once all desired battery modules 106 have been coupled together, the distribution unit 132 may be secured to the battery pack 102. While the distribution unit 132 is secured to the upper face 134 of the coupled battery pack 102 in the embodiment illustrated in FIGS. 2-4, a distribution unit may alternatively be secured to a lateral face 136 of the battery pack 102 if appropriate for given application. Once secured together, the battery modules 106 may be electrically connected to each other, and to the distribution unit 132, if utilized, by way of cables 120 or the like.

Figure 8:
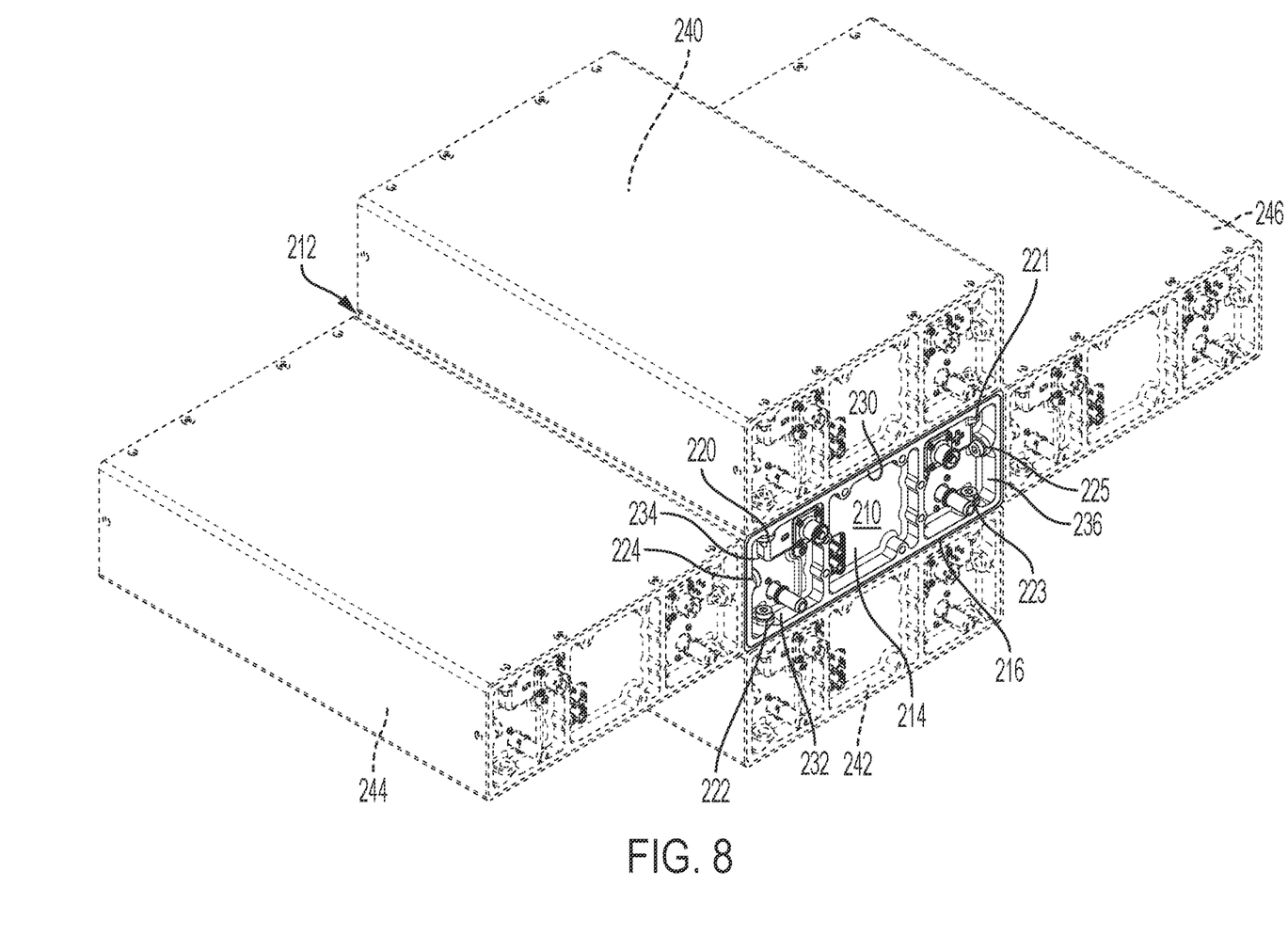
FIG. 8 is a fragmentary isometric view of a construction of an alternative embodiment of an exemplary battery pack utilizing the battery module of FIGS. 5-7.
Figure 9:
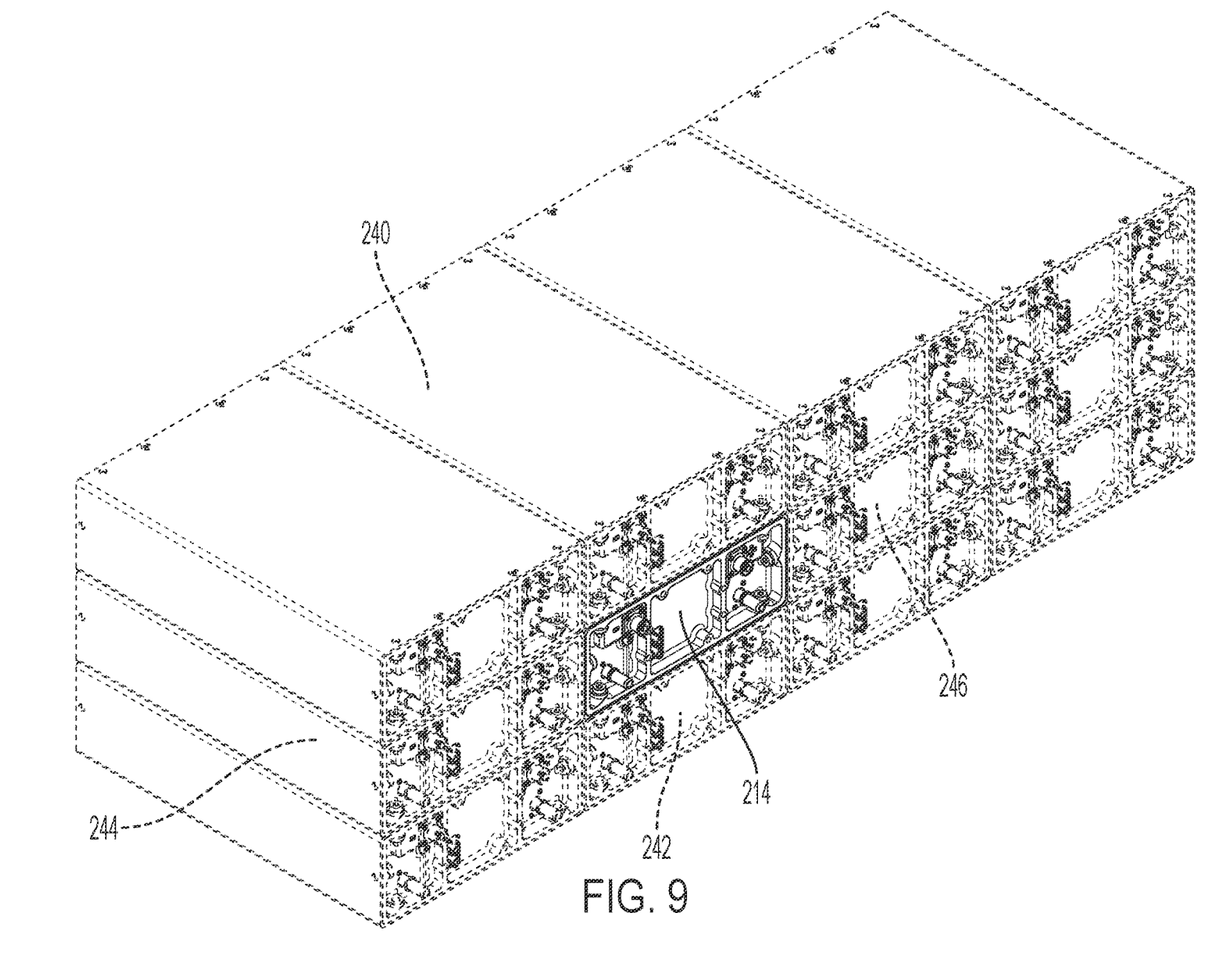
FIG. 9 is an isometric view of further construction of the exemplary battery pack utilizing the battery module of FIG. 8.

While the embodiment illustrated in FIGS. 2-4 includes a battery pack 102 constructed of two columns of seven battery modules 106, it will be appreciated that battery packs of alternative voltage and power delivery, as well as different geometries may be constructed from the battery modules 106. That is, referring to FIG. 8, in at least one embodiment, the front and rear plates 210, 212 of the battery module 214 may be provided with coupling bosses 220, 221, 222, 223, 224, 225 along each of the top edge 230, bottom edge 232, and lateral edges 234, 236, with corresponding plate bores (not visible in FIG. 8), and the housing 216 provided with axially aligned respective housing bores (not visible with regard to battery module 214 in FIG. 8). In this way, additional battery modules 240, 242, 244, 246 may be secured at each of the of the top face, bottom face, and lateral faces of the housing 216 of battery module 214. Further battery modules may be secured to battery modules 240, 242, 244, 246 secured with the battery module 214, allowing the construction of various sizes and geometric shapes of battery packs, as further illustrated in FIG. 9.

In at least one embodiment, the bosses 128 of the base 122 and the plate bores 141 of the coupling bosses 140 of the battery module 106 are internally threaded. In at least one embodiment, a portion of the bosses 128 of the base 122 and the plate bores 141 of the coupling bosses 140 of the battery module 106 are internally threaded, while the remaining bosses 128 of the base 122 and plate bores 141 of the coupling bosses 140 of the battery module 106 are not threaded; rather, the remaining bosses 128 of the base 122 and plate bores 141 of the coupling bosses 140 of the battery module 106 are unthreaded. In this way, assembly of a battery pack 102 may be simplified. It will be noted, however, that when the bosses 128 of the base 122 and/or the bores 141 of the coupling bosses 140 of the battery module 106 include unthreaded bores, the couplers 130 are inserted first through the unthreaded bore and then threaded into the threaded bore.

By way of example only, in the embodiment illustrated in FIGS. 2-4, the bosses 128 of the base 122 may be internally threaded, while the coupling bosses 152, 153 of the first battery module 150 may include unthreaded plate bores. In this way, couplers 130 may be inserted through the unthreaded plate bores of the coupling bosses 152, 153 of the first battery module 150, and then secured within the threaded bores of the bosses 128 of the base 122. Similarly, the coupling bosses 155, 156 of the first battery module 150 may include threaded plate bores, while the coupling bosses 162, 163 of the second battery module 160 may include unthreaded plate bores such that couplers 130 inserted through the unthreaded plate bores of the coupling bosses 162, 163 of the second battery module 160 may be secured within the threaded plate bores of the coupling bosses 155, 156 of the first battery module 150. Similarly, the coupling boss 192 of the fourth battery module 190 may include an unthreaded plate bore, while the coupling boss 182 of the first battery module 150 may include a threaded plate bore. In this way, a mating coupler 130 may be inserted through the unthreaded plate bore of the coupling boss 192 of the fourth battery module 190 and secured in the threaded plate bore of the coupling boss 182 of the first battery module 150.

Those of skill in the art will thus appreciate that the construction of a battery module 106 may thus be standardized. For example, the coupling bosses disposed along the lower edge of a face may include unthreaded plate bores, while the coupling bosses along the opposite, upper edge may include threaded plate bores; similarly, the coupling boss along one lateral edge of a face may include an unthreaded plate bore, while the coupling boss along the opposite, lateral edge may include a threaded plate bore.

INDUSTRIAL APPLICABILITY

The present disclosure is applicable to battery packs utilized in various machines and applications. The battery system may include a plurality of battery modules including batteries of varying values of power output and voltage output, optional bases of varied sizes, and couplers, such as bolts or rivets, from which various sizes and configurations of battery packs may be constructed. As a result, the battery system may provide individualized battery packs of desired power output and voltage output based upon the configuration.

The battery system may utilize a standard size of battery modules to address design needs of various applications. Inasmuch as battery packs may be assembled to meet the requirements of an application, the battery system may facilitate the construction of battery packs to meet the battery requirements and volumes of low volume applications as well as high volume applications.

This use of standardized sizes and performance may result in reduced costs and investment in inventory and warehousing, as well as investment in validation.

In at least some applications, the battery system may facilitate the construction of battery packs to not only meet the power output and voltage requirements, but also the physical constraints of the application. That is, in at least some applications, a battery pack may be constructed to fit within a given geometric space afforded in a machine, for example.

Battery packs constructed according to the teachings of this disclosure may require no external framework or rack for support of the individual modules. This practical construction may simplify the design of battery packs, as well as minimize the manufacturing costs of such construction, particularly in low volume applications.

It will be appreciated that the assembly and electrical connection of at least some embodiments may be performed partially or completely at a manufacturing facility, an assembly facility, or on site, allowing flexibility in the construction and shipment of such battery packs.

As battery modules are used in various applications, the power output and voltage output may diminish over time. Accordingly, a battery system according to teachings of this disclosure may be utilized to repurpose battery modules for a second life in different battery packs. This repurposing may reduce the volume of batteries scraped or disassembled for recycling of interior metals. Thus, this repurposing may result in an environmentally friendly arrangement in that it may minimize batteries sent to landfill.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A battery module for construction of a battery pack, the battery module comprising:
   a rectangular housing, the rectangular housing including a top face, a bottom face, a first side face extending between the top face and the bottom face, a second side face extending between the top face and the bottom face, a front open end and a rear open end, the rectangular housing including a plurality of housing bores extending substantially perpendicular through the top face, the bottom face, the first side face and the second side face proximal to the front open end, and a plurality of housing bores extending substantially perpendicularly through the top face, the bottom face, the first side face and the second side face proximal to the rear open end;

a battery disposed within the rectangular housing;

a rear plate, the rear plate closing the rear open end of the rectangular housing, the rear plate including a plurality of rear plate bores in axial alignment with the plurality of housing bores proximal the rear open end of the rectangular housing; and a front plate, the front plate closing the front open end of the rectangular housing, the front plate including a positive terminal and a negative terminal electrically connected to the battery, the battery being within the rectangular housing and the positive and negative terminals each protruding from an exterior side of the front plate, the battery being sealed within the rectangular housing, the rear plate, and the front plate, the front plate including a continuous flanged surface spacing a portion of the front plate from an outer edge of the rectangular housing, and the front plate including a plurality of front plate bores on the continuous flanged surface and in axial alignment with the plurality of housing bores proximal the front open end of the rectangular housing.

2. The battery module of claim 1 wherein the front plate includes a plurality of coupling bosses through which the plurality of front plate bores extend.

3. The battery module of claim 1 wherein the rear plate includes a continuous flanged surface disposed substantially adjacent to the rear open end of the rectangular housing.

4. The battery module of claim 3 wherein the rear plate is disposed substantially within the rear open end of the rectangular housing, and the front plate is disposed substantially within the front open end of the rectangular housing.

5. The battery module of claim 3 wherein the plurality of rear plate bores extend through the continuous flanged surface of the rear plate, and the plurality of front plate bores extend through the continuous flanged surface of the front plate.

6. The battery module of claim 1 wherein the rear plate includes a continuous flanged surface, the plurality of rear plate bores extending through the continuous flanged surface of the rear plate, the continuous flanged surface of the rear plate being disposed substantially within the rectangular housing, adjacent the rear open end of the rectangular housing, and wherein the plurality of front plate bores extending through the continuous flanged surface of the front plate, the continuous flanged surface of the front plate being disposed substantially within the rectangular housing, adjacent the front open end of the rectangular housing.

7. The battery module of claim 6 wherein the continuous flanged surface of the rear plate include a plurality of bosses, the plurality of rear plate bores extending through the plurality of bosses of the rear plate, and the continuous flanged surface of the front plate include a plurality of bosses, the plurality of front plate bores extending through the plurality of bosses of the front plate.

8. The battery module of claim 1 wherein at least a portion of the rear plate bores are internally threaded, and at least a portion of the front plate bores are internally threaded.

9. The battery module of claim 1 wherein the front plate and the rear plate are molded structures.

10. A battery pack comprising:
a plurality of battery modules, each battery module including:
a rectangular housing, the rectangular housing including a top face, a bottom face, a first side face extending between the top face and the bottom face, a second side face extending between the top face and the bottom face, a front open end at a front edge of the rectangular housing and a rear open end at a rear edge of the rectangular housing, the rectangular housing including a plurality of housing bores extending substantially perpendicular through the top face, the bottom face, the first side face and the second side face proximal to the front open end, and a plurality of housing bores extending substantially perpendicularly through the top face, the bottom face, the first side face and the second side face proximal to the rear open end;

a battery disposed within the rectangular housing;

a rear plate, the rear plate closing the rear open end of the rectangular housing, the rear plate including a rear plate flanged surface and a plurality of rear plate bores through the rear plate flanged surface in axial alignment with the plurality of housing bores proximal the rear open end of the rectangular housing; and a front plate, the front plate closing the front open end of the rectangular housing, the front plate including a positive terminal and a negative terminal electrically connected to the battery and the positive and negative terminals each extending outward from the front plate to make an electrical connection, the battery being contained entirely within the rectangular housing, the rear plate, and the front plate, the front plate including a front plate flanged surface that forms a seal with the rectangular housing and including a plurality of front plate bores through the front plate flanged surface in axial alignment with the plurality of housing bores proximal the front open end of the rectangular housing; and at least two couplers securing together at least a first battery module and a second battery module, at least a first of the couplers being disposed through at least one of the plurality of rear plate bores in axial alignment with at least one of the plurality of housing bores proximal the rear open end of the rectangular housing, and at least a second of the couplers being disposed through at least one of the plurality of front plate bores in axial alignment with at least one of the plurality of housing bores proximal the front open end of the rectangular housing.

11. The battery pack of claim 10 further including a plurality of electrical couplers electrically coupling the terminals of at least the first battery module and the second battery module.

12. The battery pack of claim 10 further including a base, the first battery module being secured with the base.

13. The battery pack of claim 10 further including:
a distribution unit, the distribution unit being secured with at least one of the plurality of battery modules; and
a plurality of electrical couplers, at least a portion of the plurality of electrical couplers electrically coupling the terminals of the first battery module and the second battery module, and at least a portion of the plurality of electrical couplers electrically coupling the terminals of at least one of the plurality of battery modules to the distribution unit.

14. The battery pack of claim 10 wherein at least a portion of the rear plate bores are internally threaded, and at least a portion of the front plate bores are internally threaded and at least a portion of the rear plate bores are not internally threaded, and at least a portion of the front plate bores are not internally threaded.

15. The battery pack of claim 10 wherein:
the front plate flanged surface relieves the front plate to a position within the rectangular housing away from the front edge of the rectangular housing;
and the rear plate flanged surface relieves the rear plate to within the rectangular housing, away from the rear edge of the rectangular housing.

16. The battery pack of claim 10 wherein:
the front plate bores through the front plate flanged surface align with the housing bores,
the rear plate bores through the rear plate flanged surface align with the housing bores, and
each of the at least two couplers is configured to couple the first battery module to the second battery module by coupling though the front plate bores and the rear plate bores, respectively, between the front edge of the rectangular housing and the rear edge of the rectangular housing.

17. A method of constructing a battery pack, the method comprising:
providing a plurality of battery modules, each battery module including:
a rectangular housing, the rectangular housing including a top face, a bottom face, a first side face extending between the top face and the bottom face, a second side face extending between the top face and the bottom face, a front open end and a rear open end, the rectangular housing including a plurality of housing bores extending substantially perpendicular through the top face, the bottom face, the first side face and the second side face proximal to the front open end, and a plurality of housing bores extending substantially perpendicularly through the top face, the bottom face, the first side face and the second side face proximal to the rear open end;
a battery disposed within the rectangular housing;
a rear plate, the rear plate closing the rear open end of the rectangular housing, the rear plate relieved from the rear open end of the rectangular housing by a rear plate flanged surface and including a plurality of rear plate bores extending through the rear plate flanged surface and in axial alignment with the plurality of housing bores proximal the rear open end of the rectangular housing; and
a front plate, the front plate closing the front open end of the rectangular housing, the front plate relieved from the front open end of the rectangular housing by a front plate flanged surface, the front plate flanged surface contacting the top face, the bottom face, the first side face, and the second side face along an entire perimeter of the front plate flanged surface, and the front plate including a positive terminal and a negative terminal electrically connected to the battery and the positive and negative terminals each protruding from an exterior side of the front plate, the battery being sealed within the rectangular housing, the rear plate, and the front plate, the front plate including a plurality of front plate bores extending through the front plate flanged surface and in axial alignment with the plurality of housing bores proximal the front open end of the rectangular housing;

disposing a rectangular housing of a first battery module of the plurality of battery modules adjacent a rectangular housing of a second battery module of the plurality of battery modules;
disposing a first coupler through a rear plate bore of the first battery module, a housing bore through the rectangular housing of the first battery module, a housing bore through the rectangular housing of the second battery module, and a rear plate bore of the second battery module to secure the first and second battery module together;
disposing a second coupler through a front plate bore of the second battery module, a housing bore through the rectangular housing of the second battery module, a housing bore through the rectangular housing of the first battery module, and a front plate bore of the first battery module to secure the second and first battery module together; and
connecting a plurality of electrical cables to the positive and negative terminals of respective individual battery modules.

18. The method of claim 17 wherein
disposing a first coupler includes disposing the first coupler through an unthreaded rear plate bore of the first battery module, a housing bore through the rectangular housing of the first battery module, a housing bore through the rectangular housing of the second battery module, and a threaded rear plate bore of the second battery module to secure the first and second battery module together; and
disposing a second coupler includes disposing the second coupler through an unthreaded rear plate bore of the second battery module, a housing bore through the rectangular housing of the second battery module, a housing bore through the rectangular housing of the second battery module, and a threaded rear plate bore of the second battery module to secure the second and second battery module together.

19. The method of claim 17 further including:
disposing a rectangular housing of a third battery module of the plurality of battery modules adjacent a rectangular housing of at least one of the first battery module and the second battery module of the plurality of battery modules,
disposing a third coupler through a rear plate bore of the third battery module, a housing bore through the rectangular housing of the third battery module, the housing bore through the rectangular housing of the at least one of the first battery module and the second battery module, and the rear plate bore of at least one of the first and second battery modules to secure the third battery module together with at least one of the first battery module and the second battery module, and
disposing a third coupler through a front plate bore of the third battery module, a housing bore through the rectangular housing of the third battery module, the housing bore battery module, and the front plate bore of at least one of the first and second battery modules to secure the third battery module together with at least one of the first battery module and the second battery module; or
disposing at least one of the first battery module and the second battery module adjacent a base,
disposing a third coupler through a rear plate bore of at least one of the first battery module and the second battery module, a housing bore through the rectangular housing of at least one of the first battery module and the second battery module, and into the base to secure at least one of the first battery module and the second battery module together with the base, and disposing a fourth coupler through a front plate bore of at least one of the first battery module and the second battery module, a housing bore through the rectangular housing of at least one of the first battery module and the second battery module, and the base to secure at least one of the first battery module and the second battery module together with at least one of the first and second battery modules; or disposing at least one of the first battery module and the second battery module adjacent a distribution unit, disposing the third coupler through a rear plate bore of the at least one of the first battery module and the second battery module, a housing bore through the rectangular housing of at least one of the first battery module and the second battery module, and into the distribution unit to secure the at least one of the first battery module and the second battery module together with the distribution unit, and disposing the fourth coupler through a front plate bore of the at least one of the first battery module and the second battery module, a housing bore through the rectangular housing of the at least one of the first battery module and the second battery module, and the distribution unit to secure the at least one of the first battery module and the second battery module together with the base.

20. The method of claim 19 wherein the plurality of electrical cables are connected to the distribution unit, electrically coupling the individual battery modules to the distribution unit.

* * * * *